(12) United States Patent
Sawamura (10) Patent No.: US 6,859,315 B2
(45) Date of Patent: Feb. 22, 2005

(54) POLARIZATION BEAM SPLITTER AND METHOD OF PRODUCING THE SAME

(75) Inventor: Mitsuharu Sawamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 10/183,399

(22) Filed: Jun. 28, 2002

(65) Prior Publication Data

US 2003/0107808 A1 Jun. 12, 2003

(30) Foreign Application Priority Data

Jun. 29, 2001 (JP) ........................................ 2001-197978

(51) Int. Cl.[7] .......................... G02B 5/30; G02B 27/28; G03B 21/14
(52) U.S. Cl. ........................ 359/487; 359/485; 359/900; 353/20
(58) Field of Search ................................ 359/483, 485, 359/487, 900; 362/19; 353/8, 20; 349/15

(56) References Cited

U.S. PATENT DOCUMENTS

| | | | | |
|---|---|---|---|---|
| 2,748,659 A | * | 6/1956 | Geffcken et al. | 359/487 |
| 2,868,076 A | * | 1/1959 | Geffcken et al. | 359/487 |
| 4,966,438 A | * | 10/1990 | Mouchart et al. | 359/495 |
| 5,453,859 A | * | 9/1995 | Sannohe et al. | 349/9 |
| 5,579,138 A | | 11/1996 | Sannohe et al. | 359/63 |
| 5,896,232 A | | 4/1999 | Budd et al. | 359/630 |
| 5,967,635 A | * | 10/1999 | Tani et al. | 353/20 |
| 5,969,861 A | | 10/1999 | Ueda et al. | 359/488 |
| 6,130,728 A | | 10/2000 | Tsujikawa et al. | 349/9 |
| 6,147,802 A | * | 11/2000 | Itoh et al. | 359/500 |
| 6,285,423 B1 | * | 9/2001 | Li et al. | 349/96 |

FOREIGN PATENT DOCUMENTS

| | | | |
|---|---|---|---|
| EP | 0 518 111 A1 | 12/1992 | G02B/5/30 |
| EP | 1 055 955 A2 | 11/2000 | G02B/27/28 |
| JP | 6-258525 | 9/1994 | G02B/5/30 |
| JP | 6-281886 | 10/1994 | G02B/27/28 |
| JP | 6-289222 | 10/1994 | G02B/5/30 |
| JP | 6-347642 | 12/1994 | G02B/5/30 |
| JP | 7-281024 | 10/1995 | G02B/5/30 |
| JP | 08-146218 A | * 6/1996 | |
| JP | 09-184916 A | * 7/1997 | |
| JP | 11-23842 | 1/1999 | G02B/5/30 |

* cited by examiner

Primary Examiner—John Juba, Jr.
(74) Attorney, Agent, or Firm—Fitzpatrick, Cella, Harper & Scinto (57) ABSTRACT

Disclosed is a polarization beam splitter and a method of producing the same, in which the polarization beam splitter has superior polarization separation efficiency and has small angle dependence. A transparent base material having a polarization separation film, comprising a dielectric multi-layered film, is cemented at the cemented surface of the beam splitter, to provide an array-like plane type polarization beam splitter, wherein an incidence angle $\theta g$ of light upon the polarization separation film is selected to satisfy a relation $\theta g > 45$ deg.

14 Claims, 6 Drawing Sheets

POLARIZATION BEAM SPLITTER AND METHOD OF PRODUCING THE SAME

FIELD OF THE INVENTION AND RELATED ART

This invention relates to a polarization beam splitter and a method of producing the same. More particularly, the invention concerns improvements in efficiency of a polarization beam splitter for use in a liquid crystal projector, for example, having a polarization separation optical system.

As regards polarization beam splitters, conventionally, those having a shape in which a dielectric multilayer film is provided at a 45-deg. prism cemented surface (polarization separation surface) are well known. In dice type elements, usually, the refractive index of a base material (substrate material) is determined on the basis of the Brewster's condition of a film material used for the polarization separation film, and then the base material is chosen. Also, in conventional array-like plane type polarization beam splitters, in many cases, a polarization film is provided on a planar base material of white plate or BLS7, and it is alternately cemented with a base material having a reflection film provided similarly. Then, it is cut at an angle of 45 deg., and thereafter the cut surface is polished. In such case, the refractive index of a film material used as the polarization separation film is determined and, then, the film material is chosen.

Polarization beam splitters having its substrate material and film material determined in the manner as described above, are so optimized to provide a high polarization separation efficiency with respect to a predetermined incidence angle. In some cases, however, with regard to light incident on the polarization beam splitter with an angle different from the predetermined incidence angle, the polarization separation efficiency is not always high. In usual liquid crystal projectors, the incidence angle of light from a light source upon a polarization beam splitter is not always 45 deg., and thus the polarization efficiency may be low in some cases. This is because the Brewster's condition and the optimum film thickness condition are not satisfied, in respect to the incidence light of 45-deg.±αBSL7. In an attempt to solving it, Japanese Laid-Open Patent Application, Laid-Open No. 11-023842, for example, proposes use of a plurality of alternate-layer groups which satisfy the Brewster's condition.

By the way, from the standpoint of characteristics of the polarization film and easiness of production of it, if a base material having a larger refractive index and a film material having a large refractive index difference are used, then the S-polarization equivalent refractive index difference becomes large so that a large reflectance is obtainable with a smaller number of layers. This is advantageous in the characteristics of the polarization film. Since the number of layers required for the film is smaller, production of the film becomes easier. However, where a base material such as BSL7 having a low refractive index (Ng=1.52) has to be used, as disclosed in the aforementioned Japanese Laid-Open Patent Application, Laid-Open No. 11-023842, usable film materials are restricted as like a combination of MgO (or $Y_2O_3$) and $MgP_2$, for example. Further, the number of layers becomes large, and there are problems in relation to production errors and cost. Moreover, because of the largeness of the number of layers, particularly the angle dependence of P-component becomes worse. On the other hand, even where a base material having a large refractive index (Ng=1.7 to 1.8) is usable, although the optional range for usable film materials becomes wide as like combinations of $TiO_2$ and $SiO_2$, or $Ta_2O_5$ (or $ZrTiO_4$) and $Al_2O_3$, there are similar disadvantages such as an increase of the number of layers, for example.

On the other hand, polarization beam splitters having an incidence angle of 45 deg. or more are disclosed in Japanese Laid-Open Patent Application, Laid-Open Nos. 6-347642, 6-289222, 7-281024, 6-258525, and 6-281886, for example. However, since they are not of an array-like planar type, no specific consideration has been paid to enable the production of the same without changing conventional processing procedures.

SUMMARY OF THE INVENTION

It is accordingly an object of the present invention to solve at least one of the problems described above and to provide a polarization beam splitter having small angle dependence and good polarization separation efficiency, without changing conventional processing procedures. Also, it is an object of the present invention to provide a method of producing such polarization beam splitter.

In accordance with an aspect of the present invention, there is provided a polarization beam splitter having an array-like planar shape, characterized in that: a transparent base material having a polarization separation film, being made of a dielectric multilayered film, is cemented at a cemented surface between arrays, and that an incidence angle $\theta g$ of light upon the polarization separation film satisfies a relation $\theta g > 45$ deg.

In one preferred form of this aspect of the present invention, a polarization separation cemented surface provided by a dielectric multilayered film of an incidence angle $\theta g > 45$ deg. and a cemented surface provided by an S-polarization reflection film having the same incidence angle with the polarization separation cemented surface, are combined into a pair, and wherein a plurality of such pairs are used and combined into an array-like planar structure.

The angle $\theta g$ may be in a range of 45 deg.$<\theta g<60$ deg.

The angle $\theta g$ may be in a range of 49 deg.$<\theta g<56$ deg.

The polarization separation film may comprise alternate layers of $ZrO_2$ as a high refractive index material and $MgF_2$ as a low refractive index material, wherein a base material may have a refractive index of about 1.52.

The polarization separation film may comprise alternate layers of $TiO_2$ as a high refractive index material and $SiO_2$ as a low refractive index material, wherein a base material may have a refractive index of about 1.52.

The polarization separation of film may comprise alternate layers of high and low refractive index materials, of a number not greater than fourteen.

The polarization separation film may comprise alternate layers of high and low refractive index materials, of a number not greater than eleven.

In accordance with another aspect of the present invention, there is provided a polarization converting element for transforming non-polarized light into linearly polarized light, comprising: a polarization beam splitter as recited above; and a waveplate for registering a polarization direction of one of two polarized lights, being separated by a polarization separation film of the polarization beam splitter, with a polarization direction of the other polarized light.

The waveplate may be a half waveplate.

In accordance with a further aspect of the present invention, there is provided an image display unit, comprising: an illumination optical system for illuminating an image display element with light from a light source; and a projection optical system for projecting light from the image display element onto a projection surface onto which the light is to be projected; wherein said illumination optical system includes a polarization converting element as recited above.

In one preferred form of this aspect of the pre, a normal to a light entrance surface of a polarization beam splitter provided in said polarization converting element may be inclined with respect to an optical axis of said illumination optical system.

Further, a normal to a light entrance surface of a polarization beam splitter provided in said polarization converting element and an optical axis of said illumination optical system may define an angle larger than zero deg. and smaller than 20 deg.

The normal to a light entrance surface of a polarization beam splitter provided in said polarization converting element and an optical axis of said illumination optical system may define an angle larger than 3 deg. and smaller than 15 deg.

In accordance with a yet further aspect of the present invention, there is provided a method of producing a polarization beam splitter of array-like planar type in which a transparent base material having a polarization separation film, comprising a dielectric multilayered film, is cemented at a cemented surface, characterized in that: an incidence angle $\theta g$ of light upon the polarization separation film is set to satisfy a relation $\theta g > 45$ deg.; a polarization separation cemented surface provided by a dielectric multilayered film of an incidence angle $\theta g > 45$ deg. and a cemented surface provided by an S-polarization reflection film having the same incidence angle with the polarization separation cemented surface, are combined into a pair; and a plurality of such pairs are used and combined into an array-like planar structure.

In one preferred form of this aspect of the present invention, the angle $\theta g$ may be in a range of 45 deg.$<\theta g<60$ deg.

The polarization separation film may comprise alternate layers of $ZrO_2$ as a high refractive index material and $MgF_2$ as a low refractive index material, wherein a base material may have a refractive index of about 1.52.

The polarization separation film may comprise alternate layers of $TiO_2$ as a high refractive index material and $SiO_2$ as a low refractive index material, wherein a base material may have a refractive index of about 1.52.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2A and 2B are schematic and sectional views for explaining an array-like planar type polarization beam splitter according to an embodiment of the present invention, wherein

DESCRIPTION OF THE PREFERRED EMBODIMENTS

In accordance with the present invention, having the structure arranged as described above, a polarization beam splitter having small angle dependence and good polarization separation efficiency as well as a method of producing such polarization beam splitter are provided. This achievement is based on the following findings which were accomplished as a result of diligent investigations made by the inventors of the subject application.

In order to solve the problems described above, first, a polarization beam splitter having a dielectric multilayer film provided at a cemented surface of a transparent base material, was set so that the incidence angle $\theta g$ of an optical axis, inside the base material, with respect to the cemented surface (polarisation separation surface) satisfied a relation $\theta g > 45$ deg.

If BSL7 is used as the base material selectable film refractive index is restricted. Therefore, in order to expand the range for selectable film refractive index, a base material having a high refractive index may be used. However, the range of selectable film refractive index was enlarged by changing the incidence angle upon the cemented surface.

Figure 1A:
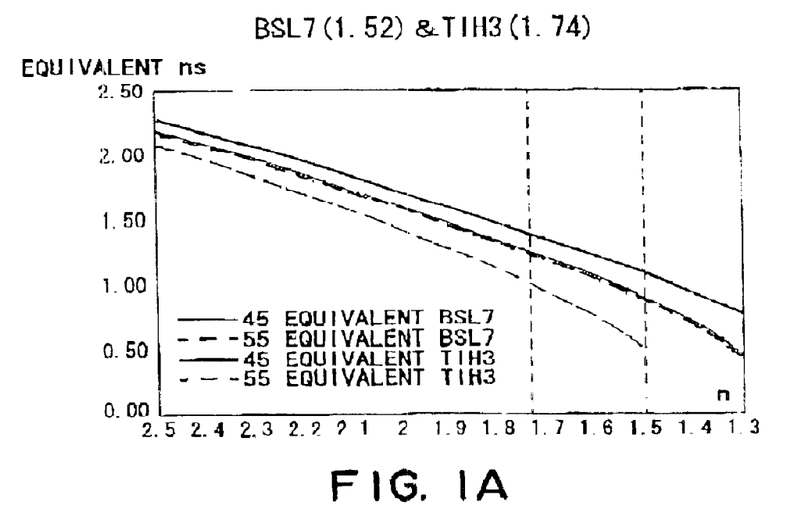
FIGS. 1A and 1B are graphs for explaining a transmission refractive index of a polarization beam splitter according to an embodiment of the present invention.
Figure 1B:
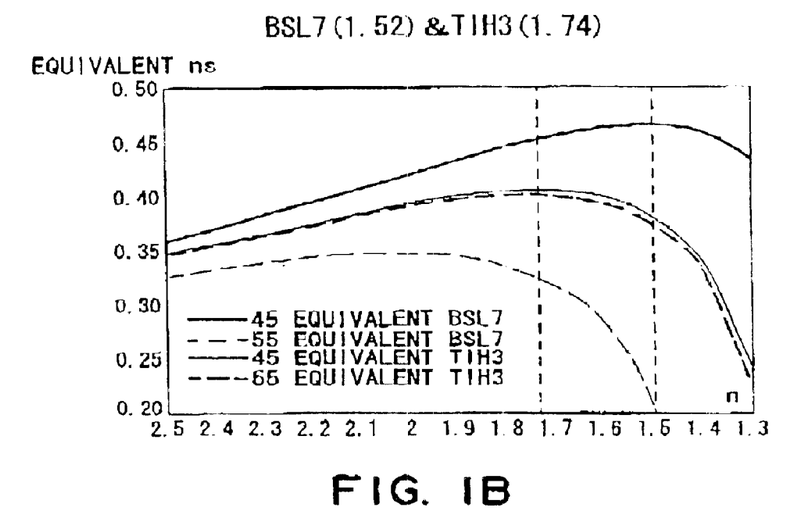

FIGS. 1A and 1B show this example.

FIG. 1A is a graph wherein a film material refractive index is taken on the axis of abscissa, while an S-polarization equivalent refractive index ($n \cos \theta$) is taken on the axis of ordinates. For example, a curve "45 Equivalent BLS7" in FIG. 1A depicts an equivalent refractive index (S-polarization equivalent refractive index: $n \cos \theta$) of the film with respect to S-polarized light which impinges on the cemented surface at an incidence angle of 45 deg. Also, FIG. 1B is a graph in which a film material refractive index is taken on the axis of abscissa, while a P-polarization equivalent refractive index ($\cos \theta/n$) is taken on the axis of ordinates.

Here, as seen from FIG. 1A, if the base material is changed from BLS7 to $TIH_3$, the solid line for "45 Equivalent BSL7" is replaced by a solid line for "45 Equivalent TIH₃". Further, if the incidence angle is changed from 45 deg. to 55 deg., the solid line for "45 Equivalent BSL7" is replaced by a broken line for "55 Equivalent BSL7". Here, since the solid line for "45 Equivalent TIH₃" and the broken line for "55 Equivalent BSL7" are appropriately overlapping with each other, it is seen that changing the base material to a material having a high refractive index and enlarging the incidence angle upon the cemented surface produce substantially the same influence.

Further, it is seen from the solid line for "45 Equivalent BSL7" in FIG. 1B that, if BSL7 is used for the base material, in order to have the same equivalent refractive index (to satisfy the Brewster's condition), practical low-refractive index materials are restricted only to MgF₂. If, however, the incidence angle is changed, it is seen from the broken line "55 Equivalent BSL7", then, like the solid line of "45 Equivalent TIH₃", materials of TiO₂, Nb₂O₃, Ta₂O₅, HfO₂, ZrO₂, Al₂O₃, and SiO₂, for example, can be used. This is a large advantage in respect to the polarization separation characteristic and to the manufacture.

It was found that: in the structure described above, where a polarization separation cemented surface of an angle θg>45 deg. and a cemented surface of an angle θg>45 deg. having an S-polarization reflection film are used in a pair and if a plurality of such pairs are cemented into a structure of array-like plane type, a beam splitter can be produced by use of a white plate of BSL7 and in accordance with the processes of cementing, cutting and polishing, as like conventionally. Namely, a polarization beam splitter of array-like plane type having a high polarization separation efficiency, without a space, is very advantageous in respect to the production.

Figure 2A:
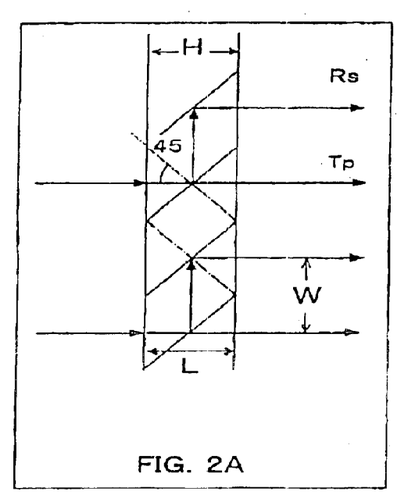
FIG. 2A shows a conventional array-like planar type polarization beam splitter.
Figure 2B:
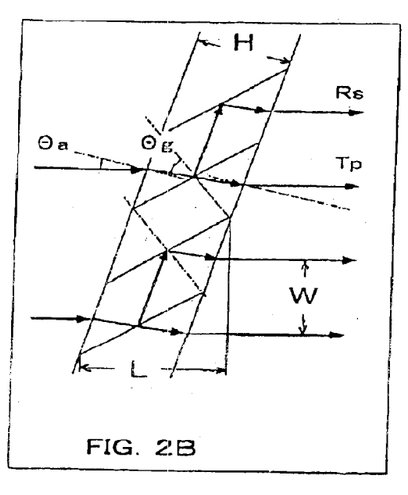
FIG. 2B shows an array-like planar type polarization beam splitter to which the structure of the present invention is applied.

FIG. 2A is a schematic and sectional view of a polarization beam splitter of conventional array-like plan type, and FIG. 2B is a schematic view of an array-like planar type polarization beam splitter to which the structure of the present invention as described above is applied.

In FIGS. 2A and 2B, denoted at W is a split beam width, and denoted at H is a plate thickness in the array like plane type structure. Denoted at L is a space occupied in the depth direction, and denoted at θa is an incidence angle of the optical axis with respect to a glass surface (it is zero deg. in the case of FIG. 2A). Denoted at θg is an incidence angle of the optical axis with respect to a cemented surface, and it is 45 deg. in the case of FIG. 2A.

The incident light is separated by a polarization separation film into a transmitted P component (Tp) and a reflected S component (Rs) Additionally, by means of a reflection film, the component Rs is emitted in the same direction as the component Tp. Here, the dimensional relation can be expressed by an equation (A), below $$H = W \times \cos(2 \times \theta g - 90)/\cos \theta g$$

$$L = m \times W \times \tan \theta a + H/\cos \theta a \quad (A)$$

where m is the number of steps or levels.

Now, examples of the present invention will be described. It should be noted here that the present invention is not limited at all by these examples.

EXAMPLE 1

Figure 3:
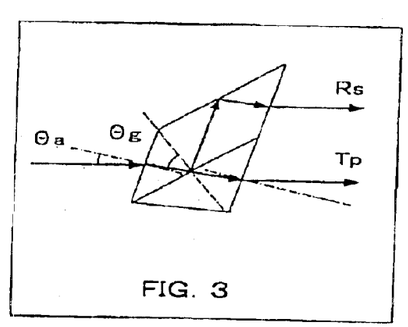
FIG. 3 is a schematic and sectional view of a polarization beam splitter according to first to fourth examples of the present invention.

In the first example of the present invention, as shown in FIG. 3, two BSL7 prisms were cemented to each other, with a polarization separation film sandwiched therebetween, whereby a polarization beam splitter was provided.

However, the incidence angle θg to the cemented surface (polarization separation surface) was 55 deg., and it was arranged so that light entered from the film side (opposite side of the substrate). Table 1 below shows the film structure of the polarization separation film in this case. In the first example, TiO₂ was used as a high refractive index film, and SiO₂ was used as a low refractive index film, wherein they are cemented to each other by use of an UV-setting adhesive agent.

Figure 4:
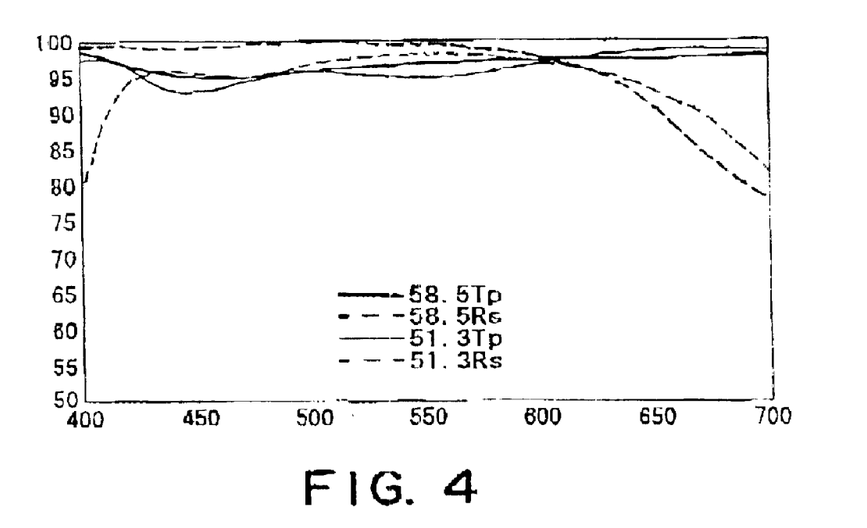
FIG. 4 is a graph for explaining characteristics of a polarization film in the first example of the present invention.

FIG. 4 shows angle dependence spectral characteristics of the polarization separation film in this case. Here, a curve 58.5Tp shows the relation between the transmissivity and the wavelength of P-polarized light which impinges on the cemented surface (polarization separation film) at an incidence angle of 58.5 deg. Also, a curve 58.5Rs shows the relation between the reflectivity and the wavelength of S-polarized light which impinges on the cemented surface at an incidence angle of 58.5 deg. This incidence angle 58.5 deg. deviates from an angle 55 deg. by 3.5 deg. in the positive direction. This deviation corresponds to an angular deviation of +6 deg. in the atmosphere. Similarly, a curve 51.3Tp shows the relation between the transmissivity and the wavelength of P-polarized light which impinges on the cemented surface (polarization separation film) at an incidence angle of 51.3 deg. Also, a curve 51.3Rs shows the relation between the reflectivity and the wavelength of S-polarized light which impinges on the cemented surface (polarization separation surface) at an incidence angle of 51.3 deg. Here, this incidence angle 51.3 deg. deviates from the angle 55 deg., set as described above, by 3.7 deg. in the negative direction. This deviation corresponds to an angular deviation of −6 deg. in the atmosphere. It is seen that, as compared with a comparative example 2 to be described later, even with use of the same BLS7 base material and of a smaller number of layers, good characteristics of higher reflectivity and higher transmissivity and both being less changeable, are obtainable

TABLE 1

| NO. OF LAYERS ADHESIVE AGENT | MATERIAL | d |
|---|---|---|
| 1 | TiO2 | 99 |
| 2 | SiO2 | 193 |
| 3 | TiO2 | 77 |
| 4 | SiO2 | 150 |
| 5 | TiO2 | 56 |
| 6 | SiO2 | 117 |
| 7 | TiO2 | 48 |
| 8 | SiO2 | 72 |
| BASE MATERIAL | BSL7 | |

In this embodiment, with the film structure described above, a polarization beam splitter of array-like plane type such as shown in FIG. 2B was produced. As regards the shape and dimension, Table 2 below shows the results of comparison made to this example (Example 1) with respect to a conventional example of array-like planar type polarization beam splitter having an incidence angle 45 deg. upon a cemented surface as well as a comparative example 1 of a planar type polarization beam splitter having the same film structure but not arranged into an array structure. Here, in FIGS. 2A and 2B, the reference character W denotes the light splitting width for an incident light flux upon the polarization beam splitter. Also, denoted at θa is the incidence angle of a chief ray of the incident light upon the polarization beam splitter, and denoted by a reference character θg is the incidence angle of a chief ray of the incident light upon the polarization separation surface of the polarization beam splitter. Denoted at H is the plate thickness of the array-like polarization beam splitter, and denoted at m is the number of steps (levels) of the arrays constituting the polarization beam splitter. Denoted at L is the length (thickness) of the polarization beam splitter in the optical axis direction (depth direction).

As regards the space L of the polarization beam splitter in the depth direction, those in both of the Example 1 and the Conventional Example may be disadvantageous as compared with the Comparative Example. It should be noted however that, in liquid crystal projectors, the brightness is very important and, therefore, use of a polarization beam splitter according to present Example 1 is very effective. Furthermore, it is seen that, as compared with the Comparative Example 1, the Example 1 made into an array-like plane type has been improved in respect to the space L.

TABLE 2

| | SUBSTRATE | SPLIT WIDTH W | θ g | θ a | PLATE THICKNESS H | NO. OF LEVELS m | SPACE L |
|---|---|---|---|---|---|---|---|
| CONVENTIONAL EXAMPLE | BSL7 | 5.0 | 45.0 | 0.0 | 5.0 | 10 | 5.0 |
| COMPARATIVE EXAMPLE | BSL7 | 25.0 | 55.0 | 31.2 | 27.5 | 2 | 62.4 |
| PRESENT EXAMPLE 1 | BSL7 | 5.0 | 55.0 | 31.2 | 5.5 | 10 | 36.7 |

EXAMPLE 2

In a second example of the present invention, like the Example 1, BSL7 prisms are cemented to each other while sandwiching a polarization separation film therebetween. In accordance with the Example 2, as compared with Comparative Example 2 to be described later, a polarization beam splitter having superior characteristics obtainable with layers of about a half number was produced.

In Example 2, the incident angle θg to the cemented surface (polarization separation surface) is 50 deg. and the light is projected from the film side of the beam splitter (opposite side of the substrate). As regards the film characteristics of the polarization separation film produced in accordance with Example 2, while the spectral characteristics of a light source to be used in liquid crystal projector have been taken into account, they have been determined to make small the angle dependence (a change in proportion of transmitted P components with a change in angle, as well as a change in proportion of reflected S components) in the range of 430–650 nm, and also to assure higher reflectivity and higher reflectivity in the range of 510–630 nm.

Figure 5:
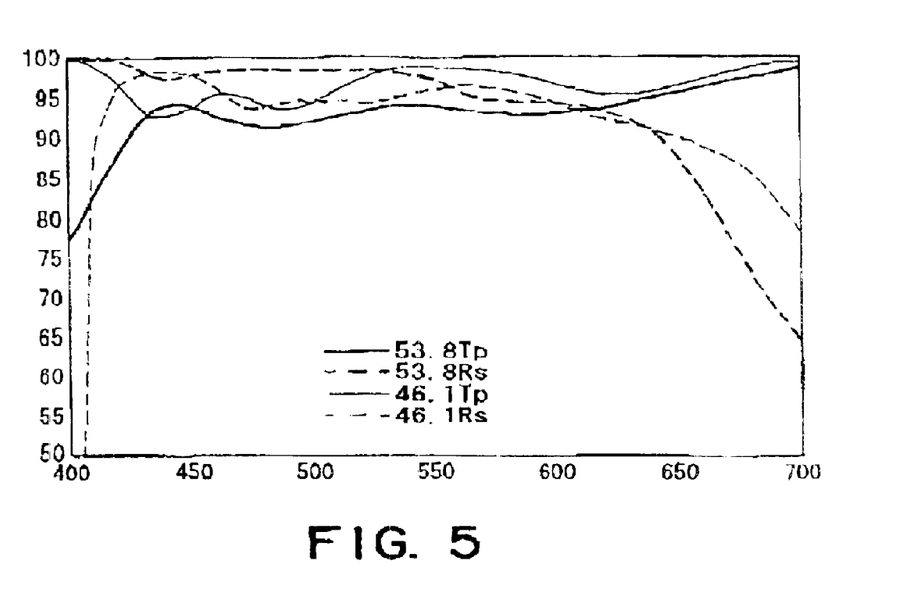
FIG. 5 is a graph for explaining characteristics of a polarization film in the second example of the present invention.

Table 3 below shows the film structure of the polarization separation film, in which $ZrO_2$ was used as a high refractive index film and $MgF_2$ was used as a low reflective index film. They were cemented to each other by using a UV-setting adhesive agent. FIG. 5 shows the angle dependence spectral characteristics of the polarization separation film of this example. The axis of ordinate represents Tp or Rs, and the axis of abscissa represents the wavelength. Curves 53.8Tp and 53.8Rs depict the relations, with respect to the wavelength, of the transmissivity and the reflectivity of P polarized light and S polarized light, respectively, impinging on the cemented surface at an angle 53.8 deg. Here, the reason for a deviation of 3.8 deg. in the positive direction from the preset incidence angle 50 deg. is that it corresponds to an angular change of +6 deg. in the atmosphere. Further, curves 46.1Tp and 46.1Rs depict the relations, with respect to the wavelength, of the transmissivity and the reflectivity of P polarized light and S polarized light, respectively, impinging on the cemented surface at an angle 46.1 deg. Here, the reason for a deviation of 3.9 deg. in the negative direction from the preset incidence angle 30 deg. is that it corresponds to an angular change of −6 deg. in the atmosphere. It is seen that, as compared with the conventional example in the Comparative Example 1, even with use of the same BLS7 base material, equivalent or superior characteristics are obtainable by layers of an approximately half number.

TABLE 3

| NO. OF LAYERS ADHESIVE AGENT | MATERIAL | d |
|---|---|---|
| 1 | ZrO2 | 217 |
| 2 | MgF2 | 130 |
| 3 | ZrO2 | 42 |
| 4 | MgF2 | 178 |
| 5 | ZrO2 | 53 |
| 6 | MgF2 | 148 |
| 7 | ZrO2 | 116 |
| 8 | MgF2 | 83 |
| 9 | ZrO2 | 146 |
| 10 | MgF2 | 124 |
| 11 | ZrO2 | 285 |
| BASE MATERIAL | BSL7 | |

Comparative Example 2

Figure 6:
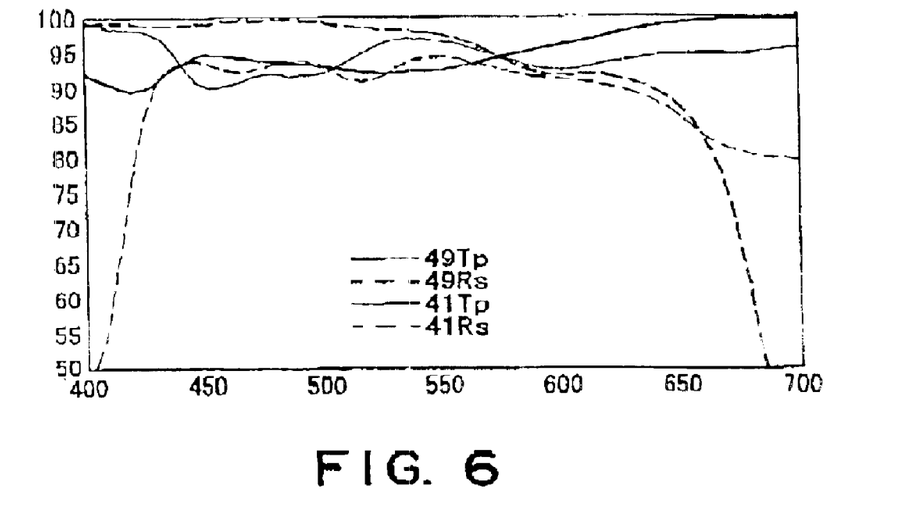
FIG. 6 is a graph for explaining characteristics of a polarization film in a comparative example 1.

Like the Example 1, BSL7 prisms were cemented to each other while sandwiching a polarization separation film therebetween, and a polarization beam splitter was produced. The incidence angle was 45 deg. and the structure was arranged so that light was projected from the film side. Table 4 below shows the film structure of the polarization separation film, in which $Y_2O_3$ was used as a high refractive index film and $MgF_2$ was used as a low refractive index film. They were cemented to each other by using a UV-setting adhesive agent. FIG. 6 shows the angle dependence spectral characteristics of the polarization separation film.

Curves 49Tp and 49Rs depict the relations, with respect to the wavelength, of the transmissivity and the reflectivity of P polarized light and S polarized light, respectively, impinging on the cemented surface at an angle 49 deg. Here, the reason for a deviation of 4 deg. in the positive direction from the preset incidence angle 45 deg. is that it corresponds to an angular change of +6 deg. in the atmosphere. Further, curves 41Tp and 41Rs depict the relations, with respect to the wavelength, of the transmissivity and the reflectivity of P polarized light and S polarized light, respectively, impinging on the cemented surface at an angle 41 deg. Here, the reason for a deviation of 4 deg. in the negative direction from the preset incidence angle 41 deg. is that it corresponds to an angular change of −6 deg. in the atmosphere. It is seen that, as compared with the Example 1 and Example 2, even with use of the same BLS7 base material, the number of layers must be increased considerably in order to obtain similar characteristics. This is very disadvantageous when manufacturing errors are taken into account.

TABLE 4

| NO. OF LAYERS ADHESIVE AGENT | MATERIAL | d |
|---|---|---|
| 1 | Y2O3 | 87 |
| 2 | MgF2 | 94 |
| 3 | Y2O3 | 57 |
| 4 | MgF2 | 137 |
| 5 | Y2O3 | 87 |
| 6 | MgF2 | 140 |
| 7 | Y2O3 | 74 |
| 8 | MgF2 | 128 |
| 9 | Y2O3 | 76 |
| 10 | MgF2 | 143 |
| 11 | Y2O3 | 98 |
| 12 | MgF2 | 155 |
| 13 | Y2O3 | 117 |
| 14 | MgF2 | 157 |
| 15 | Y2O3 | 109 |
| 16 | MgF2 | 157 |
| 17 | Y2O3 | 118 |
| 18 | MgF2 | 186 |
| 19 | Y2O3 | 117 |
| BASE MATERIAL | BSL7 | |

EXAMPLE 3

Like the Example 1, TIH$_3$ prisms were cemented to each other while a polarization separation film sandwiched therebetween, and a polarization beam splitter with which superior characteristics are obtainable with layers of a smaller number as compared with a Comparative Example 3 to be described later, was produced. It is to be noted that the incidence angle to the cemented surface (polarization separation surface) is 50 deg. and that light to be projected from the film side of the cemented surface (opposite side of the substrate) is to be handled.

Table 5 below shows the film structure of the polarization separation film of the Example 3, in which TiO$_2$ was used as a high refractive index film and Al$_2$O$_3$ was used as a low refractive index film. They were cemented to each other by using a UV-setting adhesive agent.

Figure 7:
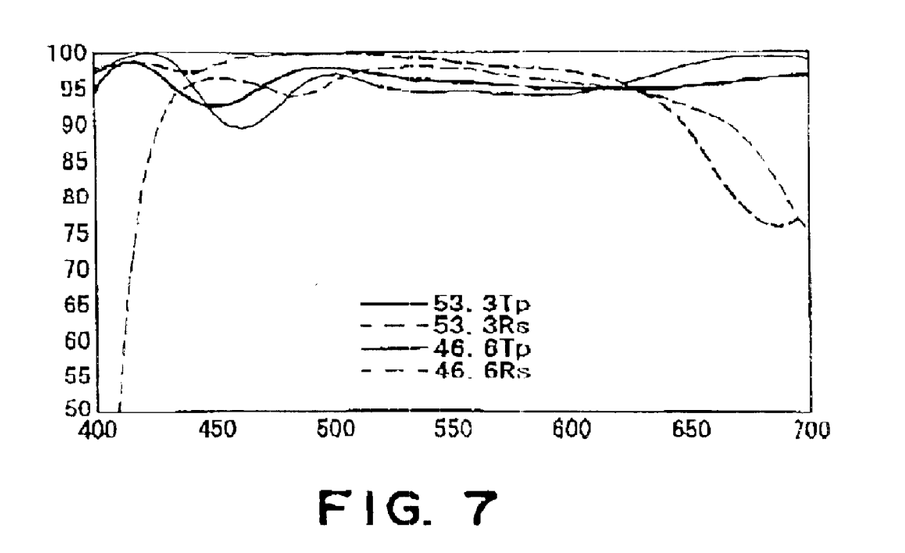
FIG. 7 is a graph for explaining characteristics of a polarization film in the third example of the present invention.

FIG. 7 shows the angle dependence spectral characteristics of the polarization separation film of this example. Curves 53.3Tp and 53.3Rs depict the relations, with respect to the wavelength, of the transmissivity and the reflectivity of P polarized light and S polarized light, respectively, impinging on the cemented surface at an angle 53.3 deg. Here, the reason for a deviation of 3.3 deg. in the positive direction from the preset incidence angle 50 deg. is that it corresponds to an angular change of +6 deg. in the atmosphere. Further, curves 46.6Tp and 46.6Rs depict the relations, with respect to the wavelength, of the transmissivity and the reflectivity of P polarized light and S polarized light, respectively, impinging on the cemented surface at an angle 46.6 deg. Here, the reason for a deviation of 3.4 deg. in the negative direction from the preset incidence angle 50 deg. is that it corresponds to an angular change of −6 deg. in the atmosphere. It is seen that, as compared with the conventional example of the Comparative Example 3, even with use of the same TIH$_3$ base material, superior characteristics of reflectivity and transmissivity both being less changeable are obtainable by layers of a smaller number.

TABLE 5

| NO. OF LAYERS ADHESIVE AGENT | MATERIAL | d |
|---|---|---|
| 1 | Al2O3 | 92 |
| 2 | TiO2 | 80 |
| 3 | Al2O3 | 159 |
| 4 | TiO2 | 99 |
| 5 | Al2O3 | 102 |
| 6 | TiO2 | 88 |
| 7 | Al2O3 | 104 |
| 8 | TiO2 | 67 |
| 9 | Al2O3 | 119 |
| 10 | TiO2 | 50 |
| 11 | Al2O3 | 85 |
| 12 | TiO2 | 185 |
| BASE MATERIAL | TIH3 | |

EXAMPLE 4

Like the Example 1, TIH$_3$ prisms were cemented to each other while a polarization separation film sandwiched therebetween, and a polarization beam splitter with which superior characteristics are obtainable with layers of a smaller number as compared with a Comparative Example 3 to be described later, was produced. The incidence angle to the cemented surface (polarization separation surface) is 55 deg. and light to be projected from the film side of the cemented surface (opposite side of the substrate) is to be handled.

Table 6 below shows the film structure of the polarization separation film of the Example 4, in which TiO$_2$ was used as a high refractive index film and Y$_2$O$_3$ was used as a low refractive index film. They were cemented to each other by using a UV-setting adhesive agent having a refractive index 1.62.

Figure 8:
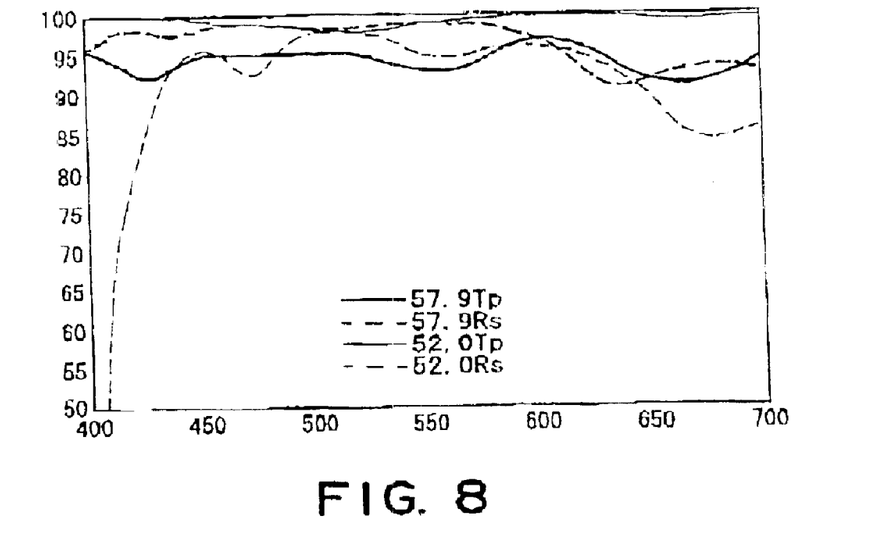
FIG. 8 is a graph for explaining characteristics of a polarization film in the fourth example of the present invention.

FIG. 8 shows the angle dependence spectral characteristics of the polarization separation film of this example. Curves 57.9Tp and 57.9Rs depict the relations, with respect to the wavelength, of the transmissivity and the reflectivity of P polarized light and S polarized light, respectively, impinging on the cemented surface at an angle 57.9 deg. Here, the reason for a deviation of 2.9 deg. in the positive direction from the preset incidence angle 55 deg. is that it corresponds to an angular change of +6 deg. in the atmosphere. Further, curves 52.0Tp and 52.0Rs depict the relations, with respect to the wavelength, of the transmissivity and the reflectivity of P polarized light and S polarized light, respectively, impinging on the cemented surface at an angle 52.0 deg. Here, the reason for a deviation of 3.0 deg. in the negative direction from the preset incidence angle 55 deg. is that it corresponds to an angular change of −6 deg. in the atmosphere. It is seen that, as compared with the conventional example of the Comparative Example 3, even with use of the same TIH$_3$ base material, superior characteristics of higher reflectivity and higher transmissivity, both being less changeable, are obtainable.

TABLE 6

| NO. OF LAYERS ADHESIVE AGENT | MATERIAL | d |
|---|---|---|
| 1 | Y2O3 | 167 |
| 2 | TiO2 | 56 |
| 3 | Y2O3 | 110 |
| 4 | TiO2 | 60 |
| 5 | Y2O3 | 117 |
| 6 | TiO2 | 65 |
| 7 | Y2O3 | 121 |
| 8 | TiO2 | 68 |
| 9 | Y2O3 | 130 |
| 10 | TiO2 | 97 |
| 11 | Y2O3 | 143 |
| 12 | TiO2 | 99 |
| 13 | Y2O3 | 193 |
| 14 | TiO2 | 102 |
| BASE MATERIAL | TIH3 | |

Comparative Example 3

Like the Example 1, TIH$_3$ prisms were cemented to each other while a polarization separation film sandwiched therebetween, and a polarization beam splitter was produced. The incidence angle to the polarization separation surface is 45 deg. and light is projected from the film side.

Table 7 below shows the film structure of the polarization separation film, in which TiO$_2$ was used as a high refractive index film and SiO$_2$ was used as a low refractive index film. They were cemented to each other by using a UV-setting adhesive agent.

Figure 9:
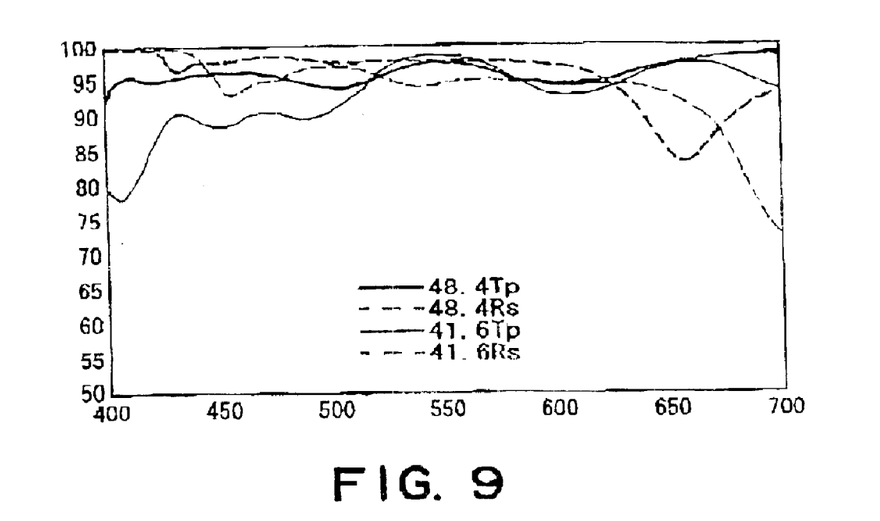
FIG. 9 is a graph for explaining characteristics of a polarization film in a comparative example 2.

FIG. 9 shows the angle dependence spectral characteristics of the polarization separation film of this example. Curves 48.4Tp and 48.4Rs depict the relations, with respect to the wavelength, of the transmissivity and the reflectivity of P polarized light and S polarized light, respectively, impinging on the cemented surface at an angle 48.4 deg. Here, the reason for a deviation of 3.4 deg. in the positive direction from the preset incidence angle 45 deg. is that it corresponds to an angular change of +6 deg. in the atmosphere. Further, curves 41.6Tp and 41.6Rs depict the relations, with respect to the wavelength, of the transmissivity and the reflectivity of P polarized light and S polarized light, respectively, impinging on the cemented surface at an angle 41.6 deg. Here, the reason for a deviation of 3.4 deg. in the negative direction from the preset incidence angle 45 deg. is that it corresponds to an angular change of −6 deg. in the atmosphere. It is seen that, as compared with the Example 3, even with use of the same TIH$_3$ base material, use of a larger number of layers is necessary, and it is very disadvantageous in relation to the manufacturing errors. Further, in respect to the transmissivity, there are large variations in characteristics as compared with the Example 3.

TABLE 7

| NO. OF LAYERS ADHESIVE AGENT | MATERIAL | d |
|---|---|---|
| 1 | TiO2 | 123 |
| 2 | SiO2 | 93 |
| 3 | TiO2 | 126 |
| 4 | SiO2 | 98 |
| 5 | TiO2 | 119 |
| 6 | SiO2 | 36 |
| 7 | TiO2 | 106 |

TABLE 7-continued

| NO. OF LAYERS ADHESIVE AGENT | MATERIAL | d |
|---|---|---|
| 8 | SiO2 | 100 |
| 9 | TiO2 | 51 |
| 10 | SiO2 | 134 |
| 11 | TiO2 | 51 |
| 12 | SiO2 | 108 |
| 13 | TiO2 | 41 |
| 14 | SiO2 | 39 |
| 15 | TiO2 | 127 |
| BASE MATERIAL | TIH3 | |

While embodiments and examples of a polarization beam splitter according to the present invention have been described, present invention is not limited to them. For example, in the examples described above, the incidence angle of light upon the polarization separation film is 50 deg. or 55 deg. However, provided that the incidence angle is in a range greater than 45 deg. and smaller than 60 deg., substantially the same advantageous results as of the above-described examples of the present invention will be attainable. The advantageous effect will be stronger, where the angle is preferably not less than 45 deg. and not greater than 56 deg.

Figure 10:
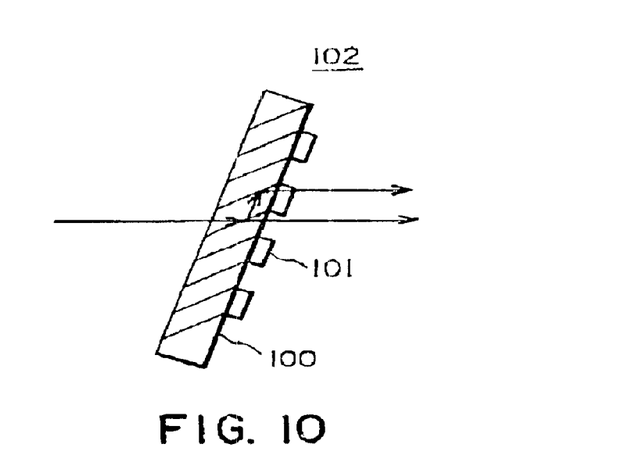
FIG. 10 is a schematic view of a polarization converting element using a polarization beam splitter according to the present invention.
Figure 11:
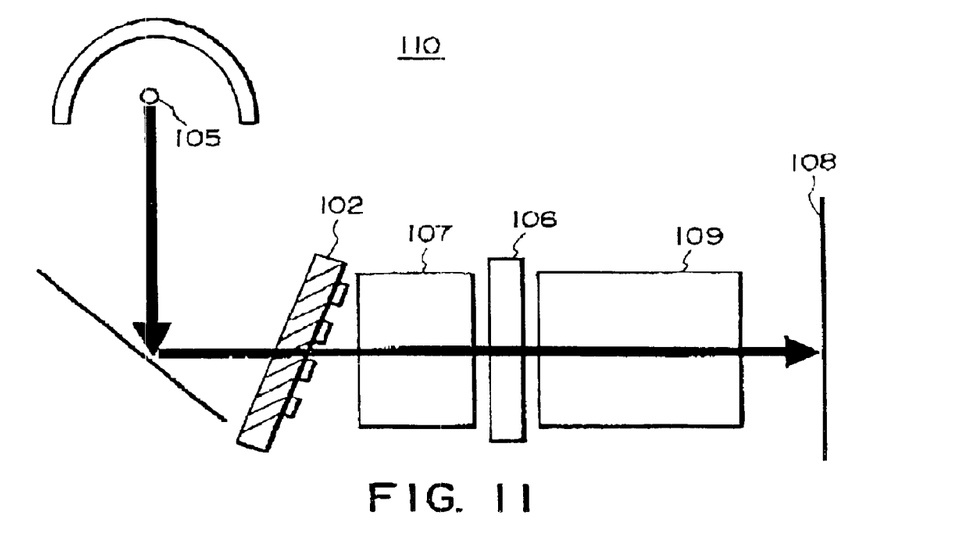
FIG. 11 is a schematic view of an image display unit using a polarization converting element shown in FIG. 10.

Further, as shown in FIG. 10, a polarization beam splitter 100 according to the present invention may be combined with a half waveplate 101, to provide a polarization converting element 102 for transforming non-polarized light into linearly polarized light having a polarization direction being approximately straight. Moreover, as shown in FIG. 11, a polarization converting element produced such as described above may be used to convert light from a light source 105 into linearly polarized light, so that an image display unit 110 which includes an illumination optical system 107 for illuminating an image display element 106 (such as a liquid crystal panel or DMD, for example) with the linearly polarized light, and a projection optical system 109 for projecting light from the image display element onto a predetermined plane (screen) 108, may be provided.

In such image display unit, the optical axis of the illumination optical system may preferably be set to define an angle not less than 45 deg. with respect to the polarization separation surface of the polarization converting element described above. Also, to this end, the light entrance surface of the polarization converting element may preferably be disposed with an angle greater than 0 deg. and smaller than 20 deg. with respect to the optical axis from the light source, and more preferably, an angle larger than 3 deg. and smaller than 15 deg.

Additionally, the present invention can be applied not only to a polarization converting element or an image display unit, but also to a video instrument system in which an imagewise signal from a computer or a video instrument is transmitted and it is received by a receiving unit of an image display unit to display an image corresponding to the imagewise signal.

In accordance with the embodiments and examples of the present invention as described above, a polarization beam splitter with superior polarization separation efficiency and small angle dependence, as well as a method of producing a polarization beam splitter to ensure it, can be accomplished. Also, a video instrument system can be structured.

While the invention has been described with reference to the structure disclosed herein, it is not confined to the details set forth and this application is intended to cover such modifications or changes as may come within the purpose of the improvements or the scope of the following claims.

What is claimed is:

1. An image display unit, comprising:

an illumination optical system for illuminating an image display element with light from a light source; and a projection optical system for projecting light from the image display element onto a projection surface onto which the light is to be projected, wherein said illumination optical system includes a polarization converting element for transforming non-polarized light into linearly polarized light, said polarization converting element comprising:

a polarization beam splitter having an array-like planar shape, comprising a transparent base material having a polarization separation film, made of a dielectric multilayered film, cemented at a cemented surface between arrays, wherein an incidence angle θg of a principal direction from which light is incident upon the polarization separation film satisfies a relation θg>45 deg., and wherein an angle formed by a normal to a light incidence surface of said polarization beam splitter and an optical axis of the light incidence angle of said polarization beam splitter is not less than 0 deg. and not more than 20 deg.; and a waveplate for registering a polarization direction of one of two polarized lights, being separated by said polarization separation film of said polarization beam splitter, with a polarization direction of the other polarized light, wherein a normal to a light entrance surface of a polarization beam splitter provided in said polarization converting element is inclined with respect to an optical axis of said illumination optical system.

2. An image display unit according to claim 1, wherein the angle θg is in a range of 45 deg.<θg<60 deg.

3. An image display unit according to claim 1, wherein the angle θg is in a range of 49 deg.<θg<56 deg.

4. An image display unit according to claim 1, wherein the polarization separation film comprises alternate layers of $TiO_2$ as a high refractive index material and $SiO_2$ as a low refractive index material, and wherein said base material has a refractive index of about 1.52.

5. An image display unit according to claim 1, wherein said polarization separation film comprises alternate layers of high and low refractive index materials, of a number not greater than fourteen.

6. An image display unit according to claim 1, wherein said polarization separation film comprises alternate layers of high and low refractive index materials, of a number not greater than eleven.

7. A polarization beam splitter having an array-like planar shape, comprising:

a transparent base material having a polarization separation film, made of a dielectric multilayered film, cemented at a cemented surface between arrays, wherein an incidence angle θg of light upon the polarization separation film satisfies a relation θg>45 deg., wherein the polarization separation film comprises alternate layers of $ZrO_2$ as a high refractive index material and $MgF_2$ as a low refractive index material, and wherein said base material has a refractive index of about 1.52.

8. A polarization converting element for transforming non-polarized light into linearly polarized light, comprising:

a polarization beam splitter as recited in claim 7; and a waveplate for registering a polarization direction of one of two polarized lights, being separated by said polarization separation film of said polarization beam splitter, with a polarization direction of the other polarized light.

9. A polarization converting element according to claim 8, wherein said waveplate is a half waveplate.

10. An image display unit, comprising:

an illumination optical system for illuminating an image display element with light from a light source; and a projection optical system for projecting light from the image display element onto a projection surface onto which the light is to be projected, wherein said illumination optical system includes a polarization converting element as recited in claim 9.

11. An image display unit according to claim 10, wherein a normal to a light entrance surface of a polarization beam splitter provided in said polarization converting element is inclined with respect to an optical axis of said illumination optical system.

12. An image display unit comprising:

an illumination optical system for illuminating an image display element with light from a light source; and a projection optical system for projecting light from the image display element onto a projection surface onto which the light is to be projected, wherein said illumination optical system includes a polarization converting element for transforming non-polarized light into linearly polarized light that comprises a polarization beam splitter, and a waveplate for registering a polarization direction of one of two polarized lights, being separated by said polarization separation film of said polarization beam splitter, with a polarization direction of the other polarized light, wherein said polarization beam splitter has an array-like planar shape, and comprises a transparent base material having a polarization separation film, made of a dielectric multilayered film, cemented at a cemented surface between arrays, wherein an incidence angle θg of light upon the polarization separation film satisfies a relation θg>45 deg., and wherein a normal to a light entrance surface of said polarization beam splitter and an optical axis of said illumination optical system define an angle larger than zero deg. and smaller than 20 deg.

13. An image display unit comprising:

an illumination optical system for illuminating an image display element with light from a light source; and a projection optical system for projecting light from the image display element onto a projection surface onto which the light is to be projected, wherein said illumination optical system includes a polarization converting element for transforming non-polarized light into linearly polarized light that comprises a polarization beam splitter, and a waveplate for registering a polarization direction of one of two polarized lights, being separated by said polarization separation film of said polarization beam splitter, with a polarization direction of the other polarized light, wherein said polarization beam splitter has an array-like planar shape, and comprises a transparent base material having a polarization separation film, made of a dielectric multilayered film, cemented at a cemented surface between arrays, wherein an incidence angle θg of light upon the polarization separation film satisfies a relation θg>45 deg., and wherein a normal to a light entrance surface of said polarization beam splitter and an optical axis of said illumination optical system define an angle larger than 3 deg. and smaller than 15 deg.

14. A method of producing a polarization beam splitter of array-like planar type, comprising the steps of:

providing a transparent base material having a polarization separation film, comprising a dielectric multilayered film, cemented at a cemented surface, wherein an incidence angle θg of light upon the polarization separation film is set to satisfy a relation θg>45deg.;

combining into a pair a polarization separation cemented surface provided by a dielectric multilayered film of an incidence angle θg>45 deg. and a cemented surface provided by an S-polarization reflection film having the same incidence angle with the polarization separation cemented surface; and combining a plurality of such pairs into an array-like planar structure, wherein the polarization separation film comprises alternate layers of $ZrO_2$ as a high refractive index material and $MgF_2$ as a low refractive index material, and wherein a base material has a refractive index of about 1.52.

* * * * *